(12) United States Patent
Nakamura et al.

(10) Patent No.: US 6,846,889 B1
(45) Date of Patent: Jan. 25, 2005

(54) COPOLYMER, VIBRATION DAMPER, VIBRATION-DAMPING PART, AND COPOLYMER COMPOSITION

(75) Inventors: Hiroki Nakamura, Hiroshima (JP); Tetsuya Sawano, Toyama (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/913,717
(22) PCT Filed: Feb. 25, 2000
(86) PCT No.: PCT/JP00/01088
  § 371 (c)(1),
  (2), (4) Date: Aug. 17, 2001
(87) PCT Pub. No.: WO00/50477
  PCT Pub. Date: Aug. 31, 2000

(30) Foreign Application Priority Data

Feb. 25, 1999 (JP) .............................. 11/048243
Jul. 29, 1999 (JP) .............................. 11/215241

(51) Int. Cl.$^7$ ............................................. C08F 130/02
(52) U.S. Cl. .................... 526/277; 526/320; 526/328.5; 428/461; 428/500
(58) Field of Search ................................ 526/277, 320, 526/328.5; 428/461, 500

(56) References Cited

U.S. PATENT DOCUMENTS

| 5,534,395 A | 7/1996 | Kamada et al. |
|---|---|---|
| 5,534,398 A | 7/1996 | Yasuda et al. |

FOREIGN PATENT DOCUMENTS

| EP | 0 177 139 | 4/1986 |
|---|---|---|
| EP | 0 625 541 A2 * | 11/1994 |
| EP | 0 765 889 A1 * | 4/1997 |
| GB | 2 218 708 | 11/1989 |
| JP | 62-59964 | 3/1987 |
| JP | 1-128453 | 5/1989 |
| JP | 2-188509 | 7/1990 |
| WO | WO 97/28225 * | 8/1997 |

OTHER PUBLICATIONS

Nair et al. Journal of Polymer Science, Part A, 26(7), 1791–1807, 1988.*
K. Inaishi, et al., Die Makromolekulare Chemie, vol. 176, pp. 2473–2478, "Synthesis and Polymerization of 10–[Bis-(benzyloxy) Phosphoryloxy] Decyl Methacrylate", 1975.
T. Kimura, et al., Die Makromolekulare Chemie, vol. 176, pp. 1945–1951, "Synthesis and Polymerization of Benzyl 2–(Methacryloyloxy)Ethyl Hydrogen Phosphate", 1975.

* cited by examiner

*Primary Examiner*—Helen L. Pezzuto
(74) *Attorney, Agent, or Firm*—Oblon, Spivak, McClelland, Maier & Neustadt, P.C.

(57) ABSTRACT

A copolymer excellent in vibration-damping property, flame retardancy and transparency, composed of from 20 to 100% by weight of a phosphate monomer (a) unit of the following general formula (1), from 0 to 80% by weight of a (meth) acrylate monomer (b) unit, and from 0 to 30% by weight of the other monomer (c) unit copolymerizable with them; a vibration-damping material 2 and a vibration-damping part composed of this copolymer; and a copolymer composition are disclosed:

$$CH_2=C \begin{matrix} R^1 \\ \diagdown \\ C-O-A-O-P \\ \parallel \\ O \end{matrix} \begin{matrix} O \\ \diagup OR^2 \\ \diagdown OR^3 \end{matrix} \quad (1)$$

$R^1$=a hydrogen atom or a methyl group, $R^2, R^3$=hydrogen atom; from $C_1$ to $C_8$ alkyl group or alkyl ether group, or aryl group; A=from $C_2$ to $C_{14}$ alkylene group or polyoxyalkylene group.

7 Claims, 1 Drawing Sheet

COPOLYMER, VIBRATION DAMPER, VIBRATION-DAMPING PART, AND COPOLYMER COMPOSITION

TECHNICAL FIELD

The present invention relates to a copolymer excellent in vibration-damping property, flame retardancy and transparency, a vibration-damping material and a vibration-damping part composed of this copolymer, and a composition for copolymer.

BACKGROUND ART

Conventionally, there are used a lot of vibration-damping polymer materials utilizing polymer viscoelastic behavior for reducing vibration of metals and the like. Since a vibration-damping material is usually used in the state that it is adhered to a hard substrate such as a metal, acrylic resin-based vibration-damping materials excellent in adhesion have been investigated frequently. For example, JP-A No. 4-202586 discloses a cross-linkable copolymer made of 75 to 92% by weight of a monomer necessarily composed of an alkyl acrylate having C8–12 alkyl group and 8 to 25% by weight of a carboxyl group-containing monomer which a polymer obtained by homo-polymerization of this monomer has a glass transition temperature of 50° C. or more.

Recently, vibration-damping materials are variedly used, and it is required to have various abilities such as transparency, rigidity, impact resistance and weather resistance in addition to conventional vibration-damping property. Particularly, an acrylic resin-based vibration-damping material is often required to have flame retardancy, and it is desired to achieve a vibration-damping materials having both vibration-damping property and flame retardancy.

Usually, the flame retardancy of resin is imparted by blending a flame retarder. In a general method, an organic flame retarder such as phosphorus-based retarders, nitrogen-based retarders and halogen-based retarders, and an inorganic flame retarder such as antimony trioxide and aluminum hydroxide are used as the flame retarder, and these are blended in the resin. However, when a large amount of flame retarder is added for enhancing flame retardancy, problems should occur, for example, that a flame retarder bleeds onto the surface of the resin to deteriorate transparency, and that the other properties such as mechanical strength are remarkably reduced. Further, when a halide is used as the flame retarder, toxicity thereof is problematical. There are various investigation for solving these problems, and for example, JP-A No. 7-82324 discloses a copolymer made of a monomer which can produce a transparent polymer when polymerized singly, and a monomer having a polymerizable unsaturated double bond containing phosphorus.

However, the copolymer disclosed in JP-A No. 7-82324 is a hard material used mainly for grazing, and the material cannot be applied to uses requiring flame retardancy and vibration-damping property simultaneously.

DISCLOSURE OF INVENTION

An object of the present invention is to provide a copolymer excellent in vibration-damping property, flame retardancy and transparency, a vibration-damping material and a vibration-damping part composed of this copolymer, and a copolymer composition.

The present inventors have intensively studied for attaining the above-mentioned object, and resultantly found that transparency, flame retardancy and vibration-damping property can be imparted by copolymerizing a phosphorus-containing compound having a specific structure with a (meth)acrylate monomer, leading to completion of the present invention.

Namely, the present invention is a copolymer composed of from 20 to 100% by weight of at least one phosphate monomer (a) unit of the following general formula (1), from 0 to 80% by weight of at least one (meth)acrylate monomer (b) unit, and from 0 to 30% by weight of the other monomer (c) unit copolymerizable with them:

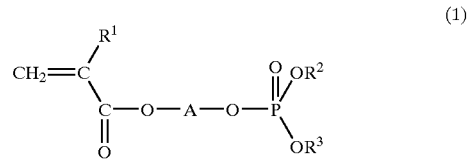

wherein, $R^1$ in the formula represents hydrogen atom or methyl group, each $R^2$ and $R^3$ independently represents hydrogen atom, or an alkyl group or an alkyl ether group having from 1 to 8 carbon atoms, or an aryl group, and A represents an alkylene group having from 2 to 14 carbon atoms or a polyoxyalkylene group.

Further, the present invention provide a vibration-damping material and a vibration-damping part composed of the above-mentioned copolymer.

Furthermore, the present invention provide a composition composed of from 20 to 100% by weight of at least one phosphate monomer (a) of the above-mentioned general formula (1), from 0 to 80% by weight of at least one (meth) acrylate monomer (b), and from 0 to 30% by weight of the other monomer (c) copolymerizable with them.

In the present invention, "(meth)acrylate" means "acrylate and/or methacrylate".

BEST MODE FOR CARRYING OUT THE INVENTION

Figure 1:
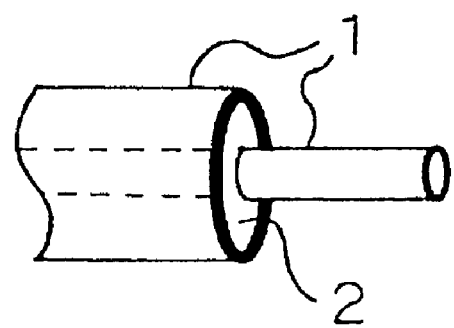
FIG. 1 shows one example of a vibration-damping part composed of a copolymer of the present invention.

The phosphate monomer (a) constituting the copolymer of the present invention is represented by the above-mentioned general formula (1). Specific examples thereof include (2-hydroxyethyl) acrylate acid phosphate, (2-hydroxyethyl) methacrylate acid phosphate, (2-hydroxypropyl) acrylate acid phosphate, (2-hydroxypropyl) methacrylate acid phosphate, (3-hydroxypropyl) acrylate acid phosphate, (3-hydroxypropyl) methacrylate acid phosphate, diphenyl-2-acryloyloxyethyl phosphate and diphenyl-2-methacryloyloxyethyl phosphate. These may also be used in combination of two or more.

Of them, diphenyl-2-methacryloyloxyethyl phosphate is preferable from the standpoints of copolymerization property and compatibility with other monomers. Namely, it is preferable to use, as at least one phosphate monomer (a), diphenyl-2-methacryloyloxyethyl phosphate singly, or to use this together with the above-mentioned other phosphate monomer. In the explanation of the invention, a polymer composed of 100% by weight of one kind of phosphate monomer. (a) unit is also explained expedientially as the copolymer. Namely, the expression "copolymer" may mean "polymer" in some cases.

The copolymer of the present invention contains a phosphate monomer (a) unit in a proportion of 20% by weight or more. When less than 20% by weight, sufficient vibration-damping property can not be manifested, and close adherence to hard parts made of metals and the like and flame retardancy also deteriorate. This amount is preferably 25% by weight or more, further preferably 30% by weight or more.

In the present invention, disclosed as examples of the (meth)acrylate monomer (b) are methyl (meth)acrylate, ethyl (meth)acrylate, isopropyl (meth)acrylate, butyl (meth)acrylate, 2-ethylhexyl (meth)acrylate, phenyl (meth) acrylate and benzyl (meth)acrylate. These may also be used in combination of two or more.

The copolymer of the present invention contains a (meth)acrylate monomer (b) unit in a proportion of from 0 to 80% by weight.

As the copolymer of the present invention, those composed of a phosphate monomer (a) unit and a (meth)acrylate monomer (b) unit are preferable. From the standpoint of manifestation of the vibration-damping property of the copolymer, the content of the (meth)acrylate monomer (b) unit in the copolymer is preferably 75% by weight or less, further preferably 70% by weight or less.

For manifestation of excellent vibration-damping property of the copolymer of the present invention, it is preferable that the glass transition temperature of the copolymer (hereinafter, the glass transition temperature of a copolymer or polymer is referred to as "Tg", expedientially) is lower than the use temperature TU of the copolymer, and more preferably, the difference of Tu and Tg is 20° C. or more. Tg of the copolymer can be lowered by inclusion a monomer unit in the copolymer wherein the monomer gives lower Tg of a polymer obtained by homo-polymerization thereof than Tg of a polymer obtained by homo-polymerization of a phosphate monomer (a) unit. From such a standpoint, a (meth)acrylate monomer (b) unit is preferably selected. When two or more (meth)acrylate monomer (b) units are used together, it is preferable to select at least one component according to such a standpoint.

In a copolymer composed of these phosphate monomer (a) unit and (meth)acrylate monomer (b) unit, the content of the (meth)acrylate monomer (b) unit is preferably 10% by weight or more, further preferably 20% by weight or more. Namely, the content of the phosphate monomer (a) unit is preferably 90% by weight or less, further preferably 80% by weight or less.

The copolymer of the present invention can contain the other monomer (c) unit as a tertiary component in a proportion of from 0 to 30% by weight which does not reduce the properties of the copolymer, in addition to the above-mentioned two component. The other monomer (c) unit is rot particularly restricted. For example, unsaturated carboxylic acids such as acrylic acid, methacrylic acid, maleic acid and itaconic acid; acid anhydrides such as maleic anhydride and itaconic anhydride; maleimide derivatives such as N-phenylmaleimide, N-cyclohexylmaleimide and N-t-butylmaleimide; hydroxyl group-containing monomers such as 2-hydroxypropyl acrylate, 2-hydroxyethyl acrylate and 2-hydroxypropyl methacrylate; nitrogen-containing monomers such as (meth)acrylamide, (meth)acrylonitrile, diacetoneacrylamide and dimethylaminoethyl methacrylate; epoxy group-containing monomers such as allyl glycidyl ether, glycidyl acrylate and glycidyl methacrylate; styrene-based monomers such as styrene and α-methylstyrene; and the like can be used.

It is preferable that the copolymer of the present invention is cross-linked, and if necessary, it can contain a cross-linkable monomer unit. Examples of the typical cross-linkable monomer unit include ethylene glycol diacrylate, allyl acrylate, ethylene glycol di(meth)acrylate, allyl (meth)acrylate, divinylbenzene, trimethylolpropane tri(meth)acrylate, 1,3-butylene di(meth)acrylate and hexamethylene diacrylate.

Further, it is preferable that Tg of the copolymer of the present invention is 80° C. or less. When Tg is lowered appropriately, vibration-damping property tends to be improved. Tg is more preferably 50° C. or less, particularly preferably 20° C. or less.

At 25° C. as the usual use temperature, it is preferable that tan δ of the copolymer of the present invention is 0.5 or more under the condition of 10 hz.

When environmental pollution is taken into consideration, it is preferable that the copolymer of the present invention does not contain a halogen atom.

The composition of the present invention is composed of from 20 to 100% by weight of at least one phosphate monomer (a), from 0 to 80% by weight of at least one (meth)acrylate monomer (b), and from 0 to 30% by weight of the other monomer (c) copolymerizable with them. As the specific examples of these monomers (a) to (c), the above-mentioned monomers are listed. Further, the composition can contain the above-mentioned cross-linkable monomer. In the present invention, a material of single component composed of 100% by weight of one phosphate monomer (a) is also referred to as "composition", expedientially.

The viscosity of this composition can be controlled by previously polymerizing a part of the monomer or the monomer mixture, or by adding a suitable high molecular weight polymer or a thickening agent. Further, if necessary, a chain transfer agent, a coloring agent, an ultra-violet absorber, a heat stabilizer, an antistatic agent, a rubbery polymer and fillers such as a inorganic filler can be added.

The copolymer of the present invention can be produced by a known method such as emulsion polymerization, solution polymerization and bulk polymerization. Of them, a bulk polymerization is particularly preferable, and in this case, a copolymer can be produced by using a polymerizable raw material obtained by adding a radical polymerization initiator to the above-mentioned composition, and polymerizing this.

As the radical polymerization initiator, known azo compounds or organic peroxides etc. can be used. As the azo compound, 2,2'-azobisisobutyronitrile, 2,2'-azobis (2,4-dimethylvaleronitrile), 2,2'-azobis(2,4-dimethyl-4-methoxyvaleronitrile) and the like are listed. As the organic peroxide, benzoyl peroxide, lauroyl peroxide, t-hexyl peroxypivalate and the like are listed. Further, polymerization initiators of redox type, for example, combinations of organic peroxides and amines can also be used.

A polymerizable raw material containing such a radical polymerization initiator added can be, for example, pouted between two facing inorganic glass plates or metal plates of which peripheral parts are sealed with a gasket and thermally polymerized to obtain a polymer in the form of a plate, or poured into a part cavity optionally shaped and polymerized under this condition.

The copolymer of the present invention is excellent particularly in vibration-damping of hard parts such as metals, and is suitable as a vibration-damping material. Specifically, the copolymer can be used as a vibration-damping part giving a structure in which the copolymer is sandwiched between two hard parts, a structure in which the copolymer is filled in a cavity of a hard part, a structure in which the copolymer is laminated to a hard part, and the like. AS the use field of the vibration-damping part, there are listed transportation machine field such as engines, engine covers, bodies of an automobile, tractor and bulldozer; field of domestic electric appliances using a motor such as a washing machine, refrigerator, cleaner and air conditioner; field of OA appliances using a motor such as a personal computer and printer; precise machine filed such as a measuring appliance; construction field of an earthquake damper and piping connection; life field as interiors such as ceiling and wall; and the like.

For example, when a vibration-damping material 2 composed of the copolymer of the present invention is filled between two steel tubes 1 placed concentrically as shown in FIG. 1, excellent vibration-damping property can be obtained.

Next, the present invention will be illustrated further specifically by examples, but the scope of the present invention is not limited by these examples. In the examples, "part" is by weight unless otherwise stated. Properties in the examples were evaluated by the following methods.

1) Glass Transition Temperature (Tg)

Tg of a copolymer resulted was measured by a differential scanning calorimeter DSC200 (manufactured by Seiko Denshi Kogyo K. K.).

2) Vibration-Damping Property (tan δ)

A copolymer resulted was cut into a disklike form having a thickness of 3 mm and a diameter of 2.5 cm, and tan δ (loss tangent) at 25° C. and 10 Hz was measured by using a rheometer RDA-700 (manufactured by Rheometric Scientific FE K. K.).

EXAMPLE 1

To a composition composed of a mixture of 53 parts of diphenyl-2-methacryloyloxyethyl phosphate (manufactured by Daihachi Kagaku Kogyo K. K., trade name: MR260) and 47 parts of 2-ethylhexyl acrylate was added 0.2 parts of a polymerization initiator t-hexylperoxypivalate, to give a polymerizable raw material. The polymerizable raw material was subjected to pressure reduction to remove remaining air, then poured into a cell having a thickness of 4.2 mm formed by two stainless plates having a longitudinal size of 460 mm and a transverse size of 610 mm and having inner surfaces to which a Teflon film had been pasted, the peripheral parts thereof being sealed with a gasket. It was polymerized in hot water of 65° C. for 120 minutes, and further polymerized under air atmosphere of 100° C. for 60 minutes, to obtain a polymer in the form of plate having a thickness of 3 mm. The flame retardancy of this plate polymer was measured according to UL-94 standard, to find it was V-0.

EXAMPLE 2

The same procedure was conducted as in Example 1 to obtain a plate polymer, except that 53 parts of diphenyl-2-methacryloyloxyethyl phosphate, 27 parts of 2-ethylhexyl acrylate and 20 parts of methyl methacrylate were used as a composition, and 0.065 parts of 2,2'-azobisisobutyronitrile was used as a polymerization initiator.

EXAMPLE 3

The same procedure was conducted as in Example 1 to obtain a plate polymer, except that 43 parts of diphenyl-2-methacryloyloxyethyl phosphate, 47 parts of 2-ethylhexyl acrylate and 10 parts of (2-hydroxyethyl) methacrylate acid phosphate (manufactured by Johoku Kagaku Kogyo K. K., trade name JPA-514) were used as a composition.

EXAMPLE 4

The same procedure was conducted as in Example 1 to obtain a plate polymer, except that 30 parts of diphenyl-2-methacryloyloxyethyl phosphate and 70 parts of butyl acrylate were used as a composition.

EXAMPLE 5

The same procedure was conducted as in Example 1 to obtain a plate polymer, except that 2 parts of benzoyl peroxide (manufactured by Kayaku Akuzo K. K., trade name: Kadox B-CH50) and 0.2 parts of N,N'-dimethylaniline were used as a polymerization initiator and polymerization was conducted for 180 minutes under an air atmosphere of 23° C. instead of polymerization in hot water of 65° C. for 120 minutes.

EXAMPLE 6

The same procedure was conducted as in Example 1 to obtain a plate polymer, except that 0.5 parts of hexamethylene diacrylate was further added as a cross-linking agent to the composition. The resulted polymer was not dissolved in a solvent such as acetone and tetrahydrofuran at all so that it was confirmed that this polymer was a cross-linked body.

Tg and tan δ of the plate polymers in Examples 1 to 6 are shown in Table 1.

COMPARATIVE EXAMPLES 1 TO 3

The same procedure was conducted as in Example 1 to obtain plate polymers, except that those described in Table 1 were used as a composition, and 0.5 parts of hexamethylene diacrylate was added as a cross-linking agent. Tg and tan δ of these plate polymers are shown in Table 1. All of the plate polymers had lower tan as compared with the plate polymers obtained in Examples, and was not preferable as a vibration-damping material

TABLE 1

|  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| Diphenyl-2-methacryloyloxy ethyl phosphate | 53 | 53 | 43 | 30 | 53 | 53 | 0 | 0 | 0 |
| 2-Ethylhexyl acrylate | 47 | 27 | 47 | 0 | 47 | 47 | 100 | 80 | 0 |
| Methyl methacrylate | 0 | 20 | 0 | 0 | 0 | 0 | 0 | 20 | 0 |
| Butyl acrylate | 0 | 0 | 0 | 70 | 0 | 0 | 0 | 0 | 100 |
| (2-Hydroxyethyl) methacrylate acid phosphate | 0 | 0 | 10 | 0 | 0 | 0 | 0 | 0 | 0 |
| Glass transition temperature (° C.) | −35 | −5 | −39 | −30 | −35 | −30 | −80 | −55 | −50 |
| tan δ (25° C.) | 0.8 | 1.2 | 0.8 | 0.8 | 0.8 | 0.8 | 0.2 | 0.5 | 0.2 |

INDUSTRIAL APPLICABILITY

The copolymer of the present invention is excellent in balance of transparency, flame retardancy and vibration-damping property, and can be used in various fields such as a vibration-damping material, sound insulation plate, paint, adhesive and various improvers. By polymerizing the composition of the present invention, the above-mentioned copolymer can be obtained easily.

What is claimed is:

1. A copolymer comprising from 20 to 100% by weight of at least one phosphate monomer (a) unit of the following general formula (1),

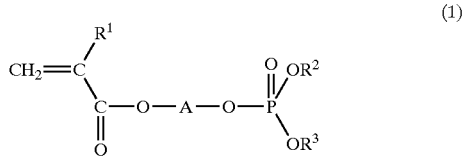

(1)

from 0 to 80% by weight of at least one (meth)acrylate monomer (b) unit, and from 0 to 30% by weight of the other monomer (c) unit copolymerizable with them, and the glass transition temperature of the copolymer is 80° C. or less: wherein, $R^1$ in the formula represents hydrogen atom or methyl group, each $R^2$ and $R^3$ independently represents hydrogen atom, or an alkyl group or an alkyl ether group having from 1 to 8 carbon atoms, or an aryl group, and A represents an alkylene group having from 2 to 14 carbon atoms or a polyoxyalkylene group; and wherein tan δ at 25° C. and 10 Hz is 0.5 or more.

2. A vibration-damping material comprising the copolymer of claim 1.

3. A vibration-damping part comprising the copolymer of claim 1.

4. An article obtained by a process which comprises:
forming the article from the copolymer as described in claim 1 in a mold or cavity.

5. A part, comprising:
the article as claimed in claim 4;
wherein the article is sandwiched between two hard parts.

6. A part, comprising:
the article as claimed in claim 4;
wherein the article fills a cavity of the part.

7. A part, comprising:
the article as claimed in claim 4;
wherein the article is laminated to the part.

* * * * *